United States Patent

Hillegass et al.

[15] 3,687,244

[45] Aug. 29, 1972

[54] BRAKE DISC AND BALANCING WEIGHT

[72] Inventors: Kenneth P. Hillegass, Akron, Ohio 44303; Albert W. Cook, Tallmadge, Ohio 44278

[73] Assignee: The Goodyear Tire & Rubber Company, Akron, Ohio

[22] Filed: Sept. 4, 1970

[21] Appl. No.: 69,637

[52] U.S. Cl..................188/218 A, 74/573, 192/30 V
[51] Int. Cl................................................F16d 65/12
[58] Field of Search....188/218 A; 74/573; 192/30 V, 192/107 R

[56] References Cited

UNITED STATES PATENTS

| | | | |
|---|---|---|---|
| 3,368,654 | 2/1968 | Wegh et al. | 188/218 A |
| 3,366,202 | 1/1968 | James | 188/218 A |

*Primary Examiner*—George E. A. Halvosa
*Attorney*—F. W. Brunner and Paul E. Milliken

[57] ABSTRACT

A U-shaped spring-like balancing weight clipped on a web of a vaned-type ventilated brake disc and tack welded to the web to permanently hold the weight in position on the disc.

2 Claims, 4 Drawing Figures

PATENTED AUG 29 1972          3,687,244

INVENTORS.
KENNETH P. HILLEGASS
ALBERT W. COOK
BY
ATTORNEY

3,687,244

BRAKE DISC AND BALANCING WEIGHT

This invention relates to a balancing weight which is welded in position on a vaned-type brake disc.

DESCRIPTION OF THE PRIOR ART

The closest prior art known to applicants are U.S. Pat. No. 3,366,202 issued to T N James and U.S. Pat. No. 3,452,845 issued to E J Harmon. Both these patents show the use of a weight which fits between a pair of adjacent webs of a brake disc and folds around the edges of the webs to retain the weight in position. Other well-known means of balancing such brake discs consist of removing material from the heavy side of the disc to sufficiently lighten the disc in that portion to balance it with the opposite circumferential location on the disc. Such techniques are time-consuming and expensive and require a great deal of trial and error adjustment before a satisfactory balance is achieved in the disc.

OBJECTS OF THE INVENTION

It is a primary object of the invention to provide a weight which may be easily temporarily attached to the web of a vaned brake disc and once it is determined that the particular weight gives the proper balance, the weight may be easily permanently attached.

A further object of the invention is to provide a weight for a brake disc which is simple and inexpensive to manufacture.

A still further object of the invention is to provide a weight which may be clipped over one of the webs in a vaned-type brake disc but which will not block a substantial portion of the hollow passage formed between the webs to permit air circulation therethrough.

These and other objects of the invention will become more fully apparent as the description proceeds in the following specification and the accompanying drawings.

DESCRIPTION OF THE PREFERRED EMBODIMENTS

Figure 1:
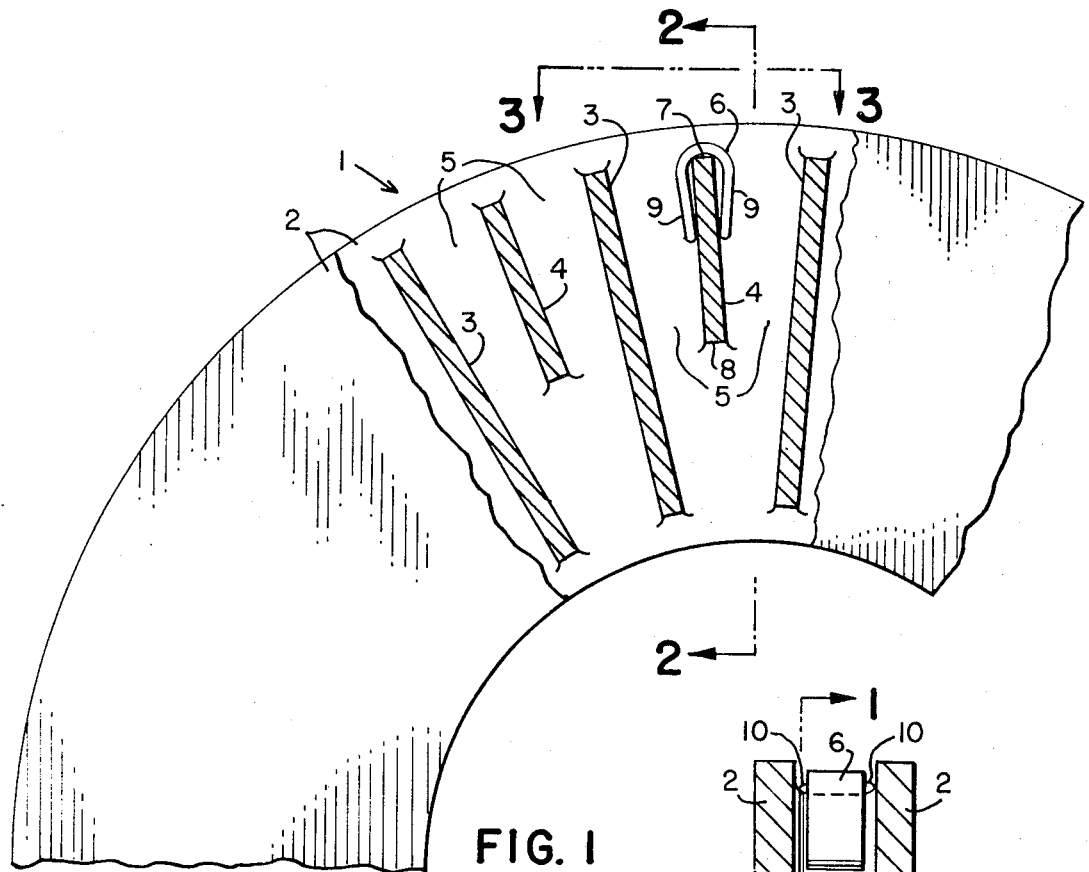
FIG. 1 shows a partial cross-sectional elevational view of a conventional annular ventilated brake disc taken on line 1—1 of FIG. 2.
Figure 3:
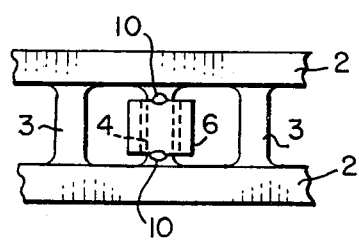
FIG. 3 shows an enlarged partial view taken on line 3—3 of FIG. 1 showing a portion of the outer circumference of the brake disc.

In the drawings, the numeral 1 indicates generally a vaned or webbed-type brake disc having a pair of flat parallel rings 2 connected to each other by a plurality of radially extending webs 3 and 4. The numeral 3 indicates a group of long webs and the numeral 4 indicates a group of shorter webs. As shown in the drawings, the long webs 3 and the short webs 4 are alternately positioned around the circumference of the disc. It should also be understood that this same invention may be utilized equally well on the type of disc in which all the webs are of the same length. By referring to FIG. 1 it may be seen that the webs 3 and 4 are circumferentially spaced apart from each other a sufficient distance to provide a plurality of radial air passages 5 extending between the rings 2 to provide air circulation throughout the disc 1.

Figure 4:
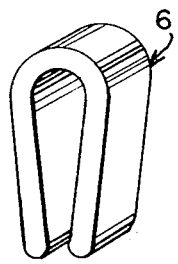
FIG. 4 shows a perspective view of the U-shaped balancing weight of the invention.
Figure 2:
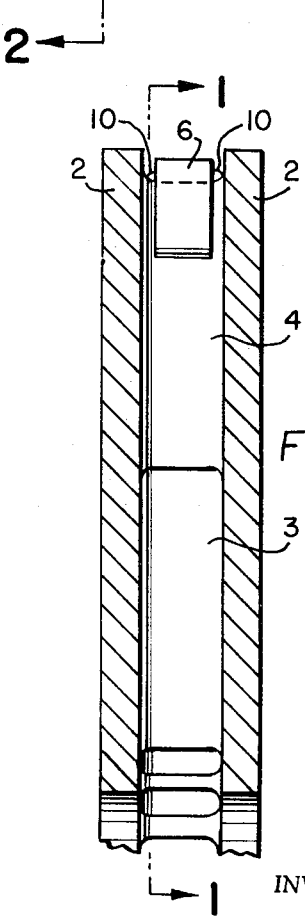
FIG. 2 shows an enlarged partial sectional elevational view of such a brake disc taken on line 2—2 of FIG. 1.

To balance the disc it is mounted on a conventional balancing machine to determine the heaviest circumferential portion of the disc. Once this is determined, a counter-balancing weight 6 shown in FIG. 4 is clipped over one of the webs 3 or 4 which is located nearest the lightest circumferential portion of disc. In the example shown in the present drawing, the weight 6 is clipped over the radially outer edge 7 of one of the short webs 4. In some instances it may be desirable to clip a weight over the radially inner edge 8 of one of he webs 3 or 4 or to clip weights on both the outer and inner edges. In most instances, however, it is more practical to place the weight at the outer edge since it will be more effective at this position in balancing the wheel and less weight will be needed if the weight is positioned at the outer edge of the web than if the weight is positioned at the inner edge. The weight 6 is made in a U-shaped configuration with the legs 9 of the U being radially short compared to the radial length of the web and inclining toward each other in such manner that when the weight 6 is slid onto the web 4, the ends of the legs 9 will actually grip the sides of the web and retain the weight on the web temporarily until it can be determined that the proper weight has been used. To accomplish this, the weight 6 is formed with the ends of the legs 9 a shorter distance apart than the thickness of the webs of the disc. This creates a force fit when the weight is on the web. Once it is found that the proper weight has been used, the weight 6 can then be permanently attached to the web by heat fusing, such as tack welding as indicated by the numeral 10, or brazing. This method of attaching the weight is much easier and less expensive than using screws or other special attachment means which require special machining of the disc and are more time-consuming to install. The weight 6 may be made of any suitable material which has a resilient spring-like quality which will permit the legs 9 to spread a sufficient distance to permit the weight to be slid onto the web while maintaining an inward gripping pressure against the web to temporarily hold the weight in position until it is permanently welded or blazed to the disc. It will be understood, of course, that various sizes and weights may be used and the shapes of the weights may vary somewhat depending upon the type of disc upon which they are being used. Various other modifications may be made without departing from the scope of the invention.

We claim:

1. In combination with a rotatable ventilated brake disc comprising two flat parallel rings connected by a plurality of radially extending webs having radially inner and outer ends and defining radial air passages between the rings of the disc, at least one balancing weight positioned on the radially outer end of at least one of the webs, said weight comprising:

A. a substantial U-shaped spring-like member having substantially straight legs with the ends of the legs of the U formed spaced apart a distance less than the thickness of the webs of the disc;

B. said weight being sufficiently resilient to permit it to be forced onto the radially outer end of the web so that it encircles the end and extends along both sides thereof;
C. said weight being radially short compared to the radial length of the webs whereby the center of gravity of the weight is concentrated toward the radially outermost point of the web;
D. the legs of said weight being biased inwardly when forced onto the web to grip the web and temporarily hold the weight in position thereon; and
E. said weight being permanently fastened to the disc by heat fusing.

2. The combination claimed in claim 1 wherein the weight is tack welded to the disc.

* * * * *